United States Patent
Yoshinari et al.

(10) Patent No.: US 6,195,326 B1
(45) Date of Patent: Feb. 27, 2001

(54) PHASE-CHANGE TYPE MEDIUM FOR USE IN HIGH DENSITY RECORDING

(75) Inventors: Jiro Yoshinari; Hiroshi Shingai; Takuya Tsukagoshi, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/433,972

(22) Filed: Nov. 4, 1999

(30) Foreign Application Priority Data

Nov. 5, 1998 (JP) ................................................. 10-330149

(51) Int. Cl.$^7$ ................................. G11B 7/24; B32B 3/02
(52) U.S. Cl. ................. 369/275.4; 428/64.4; 430/270.13
(58) Field of Search ............................. 369/275.4, 275.2, 369/275.1; 428/64.1, 64.4; 430/270.13, 320, 321

(56) References Cited

U.S. PATENT DOCUMENTS

| 5,876,822 | * | 3/1999 | Zhou et al. | 369/275.4 |
| 5,935,672 | * | 8/1999 | Zhou et al. | 369/275.4 |
| 6,040,066 | * | 3/2000 | Zhou et al. | 430/270.13 |

FOREIGN PATENT DOCUMENTS

| 6-338064 | 12/1994 | (JP) . |
| 2538046 | 7/1996 | (JP) . |
| 9-245378 | 9/1997 | (JP) . |

OTHER PUBLICATIONS

Noboru Yamada, et al., "Phase–Change Optical Disk Having a Nitride Interface Layer," Jpn. J. Appl. Phys., vol. 37, (1998), pp. 2104–2110.

Rie Kojima, et al., "Nitrogen Doping Effect on Phase Change Optical Disks," Jpn. J. Appl. Phys., vol. 37, (1998), pp. 2098–2103.

Isao Satoh, et al., "Key Technology for High Density Rewritable DVD(DVD–RAM)," IEEE Transactions on Magnetics, vol. 34, No. 2, (Mar. 1998), pp. 337–342.

Seiji Morita, et al.,"Deep Groove Method on High Density Optical Disk Memory," ODS97, WB2, (Apr. 7–9, 1997), pp. 92–93.

Shuichi Ohkubo, et al., "High Density Phase Change Optical Disk with a Si Reflective Layer for Red Laser," The Institute Of Electronics, Information And Communication Engineers, Technical Report Of IEICE, MR95–84, CPW95–122, (1996), pp. 7–12.

* cited by examiner

Primary Examiner—Tan Dinh
(74) Attorney, Agent, or Firm—Oblon, Spivak, McClelland, Maier & Neustadt, P.C.

(57) ABSTRACT

An optical recording medium of phase change type is provided. In this medium, cross erase is sufficiently suppressed and favorable recording/reproducing properties are realized in high density recording, and in particular, when the track pitch is less than 0.7 μm. The medium comprises a substrate, and a first dielectric layer, a recording layer of phase change type, a second dielectric layer, and a reflective layer disposed on the substrate in this order, and the recording layer has a crystallization temperature of at least 160° C., and the second dielectric layer has a thermal conductivity higher than that of the first dielectric layer.

9 Claims, 2 Drawing Sheets

3T SIGNAL

6T SIGNAL

PHASE-CHANGE TYPE MEDIUM FOR USE IN HIGH DENSITY RECORDING

BACKGROUND OF THE INVENTION

1. Field of the Invention

This invention relates to an optical recording medium of phase change type.

2. Prior Art

Highlight is recently focused on optical recording media capable of recording information at a high density and erasing the recorded information for overwriting. One typical overwritable optical recording medium is phase change optical recording medium wherein a laser beam is directed to the recording layer to change its crystalline state whereupon a change in reflectance by the crystallographic change is detected for reproducing the information.

Phase change optical recording media are of great interest since the medium can be overwritten by modulating the intensity of a single laser beam and the optical system of the drive unit used for their operation is simple.

When information is recorded on the optical recording medium of phase change type, the laser beam applied is of the power (recording power) such that the recording layer is heated to a temperature higher than its melting point. In the region where the recording power is applied, the recording layer melts and the molten region is thereafter quenched to form an amorphous record mark. When the record mark is erased, the laser beam applied is of the power (erasing power) such that the recording layer is heated to a temperature higher than the crystallization temperature and lower than the melting temperature. The record mark irradiated with the laser beam of erasing power is heated to a temperature higher than the crystallization temperature and then allowed to slowly cool to recover its crystalline state. Accordingly, in the optical recording media of phase change type, the medium can be overwritten by modulating intensity of a single laser beam.

In recent years, special attention is being given to rewritable digital video discs (DVD-RAM), and a recording film of phase change type is employed in such discs. In DVD-RAM Ver. 1.0, data of 2.6 GB is recorded on one side of the disc having a diameter of 120 mm. In this case, the recording is conducted at a recording wavelength of 0.65 $\mu$m, a numerical aperture NA of the optical pick up of 0.60, and a track pitch of 0.74 $\mu$m and with the recording system of land/groove recording and modulation system of 8–16 modulation, and the minimum mark length is 0.62 $\mu$m. Data transfer rate of 11.06 Mbps is attained by adopting the relative linear velocity of the disc in relation to the optical pick up of 6 m/s.

Jpn. J. Appl. Phys. vol.37 (1998) pp. 2104–2110 describes ZnS—SiO$_2$ (100 nm)/interface layer (5 nm)/Ge$_2$Sb$_2$Te$_5$ (20 nm)/ZnS—SiO$_2$ (20 nm)/Al-alloy (150 nm) as a film structure by taking the DVD-RAM specification into consideration. The number in the brackets is thickness.

In the optical recording medium of phase change type, recording at a higher recording density and a higher linear velocity is realized by improvements either on the side of the media drive system or on the side of the medium itself. Improvements of the drive system include use of the recording laser beam having a shorter wavelength, increase in NA of the optical pick up, and the like, and improvements of the medium include narrowing of the track pitch, shortening of the minimum record mark, and the like. Of the improvement on the side of the medium, the narrowing of the track pitch is likely to result in an increased cross erase wherein the record marks on the adjacent track are erased, an increased cross talk wherein the record marks on the adjacent track are read out, and a reduced C/N. In particular, when the track pitch is less than 0.7 $\mu$m, cross erase rapidly increases to invite serious increase in jitter.

In consideration of such situation, the inventors of the present invention actually conducted the recording using the film structure described in Jpn. J. Appl. Phys. vol.37 (1998) pp. 2104–2110 at a recording wavelength of 650 nm and an NA of 0.60 and using the 8–16 modulation system and the land/groove recording as in the case of DVD-RAM, and at a minimum mark length (0.42 $\mu$m) and a track pitch (0.60 $\mu$m) which were shorter than those of DVD-RAM. The jitter properties were unfavorable.

Japanese Patent Application Kokai No. (JP-A) 338064/1994 describes a method for improving the cross erase. In the information recording medium of JP-A 338064/1994, a recording film is provided and its reflectance is locally changed by laser beam irradiation. Grooves are preliminarily formed in the medium, and the land between two adjacent grooves is used for the information recording track. The groove depth corresponds to an optical length of $\lambda/7$ to $\lambda/5$ when the information reproducing laser beam has a wavelength of $\lambda$, and the groove width is substantially equal to the interval between two adjacent grooves. The beam diameter R (corresponding to the diameter of the circle at which the light intensity is $1/e^2$ of the light intensity at the center) of the information recording laser beam on the recording film and the groove width Wg fulfills the relation:

$$0.34 \leq Wg/R \leq 1.0$$

There is described in JP-A 338064/1994 that the medium disclosed therein does not suffer from deterioration in quality of the reproduced signals due to partial erasure of the record marks on the adjacent information track, namely, due to the cross erase.

The track width employed in the Example of JP-A 338064/1994 is 0.7 $\mu$m. JP-A 338064/1994 does not refer to the suppression of the cross erase at a track pitch smaller than 0.7 $\mu$m. In the experiments conducted by the inventors of the present invention wherein experimental conditions were the same as those of JP-A 338064/1994 except for the track pitch, jitter increase due to the cross erase was observed at a track pitch of 0.6 $\mu$m.

In addition, there is reported in IEEE Trans.on Magn. vol.34, No.2 (1998) p.337 that jitter increase by the cross erase takes place even when the groove depth is $\lambda/6$ at the wavelength $\lambda$ of 680 nm and the NA of 0.6, namely, at the laser beam diameter R of 929 nm, the groove width Wg of 0.65 $\mu$m, and the track pitch=0.65 $\mu$m, namely, at Wg/R of 0.70.

SUMMARY OF THE INVENTION

An object of the present invention is to provide an optical recording medium of phase change type wherein cross erase is sufficiently suppressed and favorable recording/reproducing properties are realized in high density recording, and in particular, when the track pitch is less than 0.7 $\mu$m.

Such objects are attained by any one of (1) to (9) as described below.

(1) An optical recording medium comprising a substrate, and a first dielectric layer, a recording layer of phase change type, a second dielectric layer, and a reflective layer disposed on the substrate in this order, wherein the recording layer has a crystallization temperature of at least 160° C., and the second dielectric layer has a thermal conductivity higher than that of the first dielectric layer.

(2) An optical recording medium according to the above (1) wherein the medium has a recording track pitch of less than 0.7 μm.

(3) An optical recording medium according to the above (1) or (2) wherein the recording layer contains Ge, Sb and Te as its main components.

(4) An optical recording medium according to the above (3) wherein the recording layer contains nitrogen.

(5) An optical recording medium according to any one of the above (1) to (4) wherein the first dielectric layer comprises two or more unit dielectric layers, and the unit dielectric layer of the first dielectric layer in contact with the recording layer has a thermal conductivity higher than that of the adjacent unit dielectric layer in contact with the unit dielectric layer in contact with the recording layer.

(6) An optical recording medium according to any one of the above (1) to (5) wherein the first dielectric layer comprises two or more unit dielectric layers, and the unit dielectric layer of the first dielectric layer in contact with the recording layer contains at least one of germanium nitride, silicon nitride, silicon oxide, and chromium oxide as its main component, and the adjacent unit dielectric layer in contact with the unit dielectric layer in contact with the recording layer contains a mixture of zinc sulfide and silicon oxide as its main component.

(7) An optical recording medium according to any one of the above (1) to (6) wherein the reflective layer contains at least one of aluminum, silver, copper, and gold.

(8) An optical recording medium according to any one of the above (1) to (7) wherein the reflective layer comprises two or more layers, and the layer in contact with the second dielectric layer contains aluminum as its main component.

(9) An optical recording medium according to any one of the above (1) to (8) wherein the recording layer has a thickness in the range of 10 to 18 nm.

DETAILED DESCRIPTION OF THE INVENTION

Figure 1:
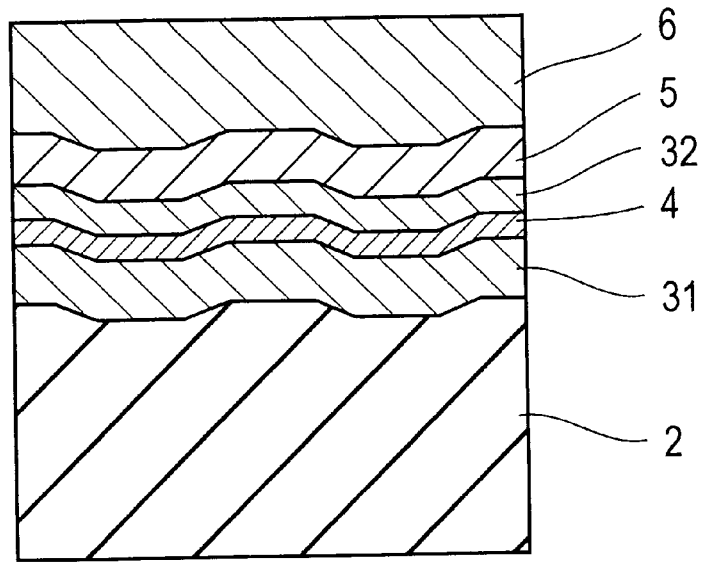
FIG. 1 is a cross sectional view of the optical recording medium according to an embodiment of the present invention.

As shown in FIG. 1, the optical recording medium of the present invention comprises a substrate 2; a first dielectric layer 31, a recording layer 4 of phase change type, a second dielectric layer 32, and a reflective layer 5 disposed on the substrate 2 in this order; and a protective layer 6 is formed on the reflective layer 5. Such structure is similar to the structure of the disc for DVD-RAM as described above.

In the present invention, crystallization temperature of the recording layer 4 is adjusted to the range of at least 160° C., and preferably, to the range of at least 170° C., and simultaneously, thermal conductivity of the second dielectric layer 32 is adjusted to a value higher than that of the first dielectric layer 31. By such constitution, cross erase can be remarkably suppressed even when the track pitch is reduced, and more illustratively, even when the track pitch is as narrow as less than 0.7 μm, and in particular, less than 0.65 μm. It should be noted that the present invention is applicable to groove recording wherein the groove formed in the substrate is used for the recording track; land recording wherein the land between adjacent grooves is used for the recording track; and land/groove recording wherein both the groove and the land are used for the recording track.

Methods for suppressing the cross erase that have so far been proposed include (1) control of the absorption coefficient by changing the medium structure such that the light absorption coefficient in the record mark region is lower than that of the region other than the record mark region, while in the conventional optical recording medium, the light absorption coefficient in the record mark (amorphous) region is higher than that of the region other than the record mark region; and (2) increase in the depth of the groove in the case of land/groove recording.

The absorption coefficient control method of the above (1) is described, for example, in IEICE (The Institute of Electronics, Information and Communication Engineers) Technology Research Report MR95-84 (1996). In this method, a new layer should be provided for the purpose of absorption coefficient control in addition to the four layers commonly provided in the conventional media: the first dielectric layer, the recording layer, the second dielectric layer, and the reflective layer. Provision of such layer is associated with the difficulty of producing a rapid cooling structure, and hence, with the difficulty of forming good record marks. Consequently, such medium is likely to suffer from insufficient recording/reproducing properties.

The method of the above (2) is described, for example, in ODS97, WB2(1997), and JP-A 245378/1997. When the cross erase is to be effectively suppressed, groove depth is preferably increased to $\lambda/3n$ (when $\lambda$ is wavelength of the recording beam and n is refractive index at the wavelength $\lambda$ of the substrate formed with the groove). Production by injection molding of the substrate having a groove with the depth of $\lambda/3n$, however, is quite difficult when the recording track pitch is reduced to the level of less than 0.7 μm.

In view of the situation as described above, the crystallization temperature of the recording layer 4 has been increased in the present invention to the level as described above to thereby reduce the influence of the heat upon recording of the adjacent track and reduce the cross erase. For the purpose of increasing the crystallization temperature of the recording layer 4 when the recording layer 4 contains Ge, Sb and Te as its main component, adoption of a composition wherein Ge and Te are relatively rich and/or inclusion of nitrogen is effective as will be described below.

In the present invention, the medium has been constituted such that the thermal conductivity of the second dielectric layer 32 on the side of the reflective layer 5 is higher than that of the first dielectric layer 31 on the side of the substrate 2 so that the more heat from the recording layer 4 is transferred to the side of the reflective layer 5. Such constitution has been adopted since the heat dissipating from the recording layer 4 to the side of the substrate 2 is the main candidate for the cross erase. In other words, the heat transferred to the substrate 2 of relatively low thermal conductivity from the recording layer 4 will not dissipate at a sufficient speed, and the adjacent track is thermally affected to invite the cross erase.

The two constitutions adopted in the present invention for the purpose of suppressing the cross erase are not sufficient by themselves. The cross erase, however, can be synergistically suppressed when these constitutions are combined. It should be noted that the thermal conductivity of the second dielectric layer is preferably 1.2 times or more, and more preferably, 1.5 times or more of that of the first dielectric layer. The thermal conductivity of the dielectric layers can be adjusted by controlling the composition of the dielectric layers.

The first dielectric layer and the second dielectric layer may have a multi-layer structure. When the dielectric layer has a multi-layer structure comprising two ore more unit dielectric layers, the thermal conductivity C of the entire dielectric layer may be calculated as described below, namely, by the equation:

$$C = \sum_{i=1}^{m} C_i \cdot t_i / t \quad (1)$$

wherein t is the overall thickness of the dielectric layer, m is the number of the unit dielectric layers included in the dielectric layer, and i-th unit layer from one surface of the dielectric layer has a thickness $t_i$ and a thermal conductivity $C_i$.

Addition of nitrogen to a Ge—Sb—Te-based recording layer is disclosed in Japanese Patent No. 2553736. Nitrogen addition is conducted in Japanese Patent No. 2553736 for the purpose of improving the overwriting and recording/ erasing properties, and no indication for the cross erase is included in Japanese Patent No. 2553736. Addition of nitrogen to a Ge—Sb—Te-based recording layer is also disclosed in Jpn. J. Appl. Phys. Vol.37 (1998) p.2098. Nitrogen addition in this case is conducted for the purpose of elevating the crystallization temperature, and there is no indication for the cross erase.

Japanese Patent No. 2538046 discloses an optical information recording/reproducing/erasing member wherein the dielectric layer under the recording layer (corresponding to the first dielectric layer of the present invention) and the dielectric layer over the recording layer (corresponding to the second dielectric layer of the present invention) are produced from different dielectric materials, and the dielectric layer under the recording layer has a thermal conductivity lower than the dielectric layer over the recording layer. Improvement of the cross erasure is not indicated in section describing the objects in Japanese Patent No. 2538046.

In the present invention, reduction in the thickness of the recording layer is desirable to further reduce the cross erase caused by the narrowing of the track pitch. More illustratively, thickness of the recording layer is preferably reduced to 10 to 18 nm, and in particular, to 10 to 16 nm. The effect of cross erase suppression is believed to have been realized by the reduced difference in the light absorption coefficient between the record marks and the region other than the record marks. On the base of such hypothesis, difference in the light absorption coefficient in the case of a thick recording layer and a thin recording layer was simulated by calculation. It should be noted that, in the following simulation, the first dielectric layer and the second dielectric layer comprise ZnS—SiO2, the recording layer comprises a $Ge_2Sb_2Te_5$ alloy, and the reflective layer comprises an Al—Cr alloy. Refractive index n and extinction coefficient k of the layers are shown in Table 1. Reflectance and absorption coefficient in the crystalline region and the amorphous region of the recording layer were also calculated. The results are shown in Table 2.

TABLE 1

|  | n | k |
| --- | --- | --- |
| ZnS–SiO$_2$ | 2.2 | 0 |
| GeSbTe (crystalline) | 4.44 | 3.48 |
| GeSbTe (amorphous) | 4.13 | 1.73 |
| AlCr | 1.8 | 5.5 |

TABLE 2

| | Thickness (nm) | | | | Crystalline region | | Amorphous region | |
| --- | --- | --- | --- | --- | --- | --- | --- | --- |
| Structure | First dielectric layer | Recording layer | Second dielectric layer | Reflective layer | Reflectance (%) | Absorption coefficient (%) | Reflectance (%) | Absorption coefficient (%) |
| (a) | 90 | 24 | 20 | 200 | 21.4 | 75.5 | 2.1 | 88.6 |
| (b) | 160 | 16 | 20 | 200 | 22.4 | 72.5 | 3.7 | 82.7 |

As shown in Table 2, the difference in the reflectance between the crystalline region and the amorphous region is equivalent in the structure (a) having a thick recording layer and in the structure (b) having a thin recording layer, while the difference in the absorption coefficient is smaller in the structure (b) having a thin recording layer. This in turn means that, when the medium is irradiated with the light of the same power, the structure (b) exhibits smaller absorption in the record mark (amorphous region), and the adjacent record mark is less likely to be erased to result in a reduced cross erase.

Figure 2:
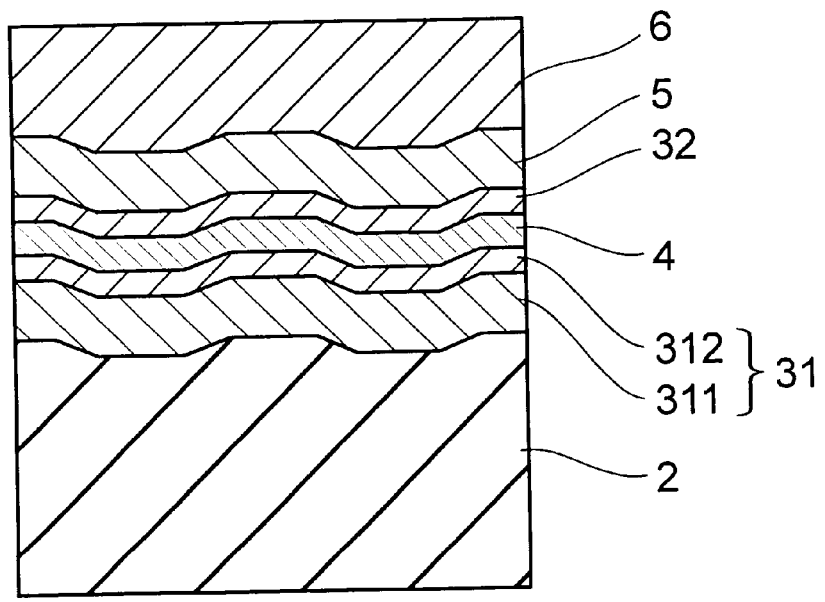
FIG. 2 is a cross sectional view of the optical recording medium according to another embodiment of the present invention.

When the minimum record mark length is reduced for the purpose of high density recording, intensity of the signals reproduced from the record marks is also reduced. To reduce such drop in the intensity of the reproduced signals, the record mark is preferably expanded in the direction of the track width to an extent not to induce an interference with the adjacent track. For such expansion of the record mark, the region which undergo temperature elevation by the recording beam irradiation should be expanded or widened in the in-plane direction of the recording layer, and in particular, in the track width direction, and a good heat diffusion in the in-plane direction of the record mark is required for such record mark expansion. Thermal conductivity of the recording layer, however, is generally low. In view of such situation, a dielectric layer having a high thermal conductivity may be disposed in contact with the recording layer to thereby improve heat diffusion in the in-plane direction of the recording layer and enable improvement in the intensity of the reproduced signals by the record mark expansion. For the reason as described above, it is preferable in the present invention that the first dielectric layer 31 is formed in double-layer structure comprising the unit dielectric layer 311 and the unit dielectric layer 312 as shown in FIG. 2, the thermal conductivity of and the unit dielectric layer 312 in contact with the recording layer 4 is higher than that of the unit dielectric layer 311 remote from the recording layer 4. When the unit dielectric layer 311 remote from the recording layer 4 comprises a mixture of zinc sulfide and silicon oxide as its main component, the unit dielectric layer 312 in contact with the recording layer 4 may comprise, for example, silicon nitride and/or silicon oxide. In the experiments of the inventors of the present invention, when the unit dielectric layer 312 comprises germanium nitride and/or chromium oxide as its main component, similar effects were found when they were used in combination with silicon nitride and/or silicon oxide. Accordingly, the unit dielectric layer 312 in contact with the recording layer 4 may comprise at least one of germanium nitride, silicon nitride, silicon oxide, and chromium oxide as its main component.

The record mark, however, should be carefully expanded since accurate reading of the record marks will be impossible if the record mark were elongated in the direction of the track length and the record mark length were increased. Widening or expansion of the record mark in the track width direction with no elongation in the track length direction can be realized by controlling the recording beam irradiation pattern.

It should be noted that the first dielectric layer 31 may comprise three or more unit dielectric layers. Even in such case, the relation between the unit dielectric layer in contact with the recording layer 4 and the unit dielectric layer in contact with such unit dielectric layer is preferably the same as the case of the unit dielectric layers 311 and 312 in FIG. 2.

The first dielectric layer 31 may preferably have a thickness of about 50 to about 280 nm. In the first dielectric layer 31, the unit dielectric layer in contact with the recording layer 4 may preferably have a thickness of 1 to 30 nm, and more preferably, 1 to 20 nm. When the unit dielectric layer in contact with the recording layer is too thick, recording sensitivity will be reduced, and the heat transferred to the side of the reflective layer 5 will be reduced to result in an increased cross erase. On the other hand, when the unit dielectric layer in contact with the recording layer is too thin, benefits of providing such layer will not be realized. The second dielectric layer 32 is preferably formed to a thickness of about 5 to about 50 nm.

The unit dielectric layer of the first dielectric layer 31 which is not in contact with the recording layer 4 may comprise any material. Such unit dielectric layer, however, may preferably comprise a dielectric material containing a mixture of zinc sulfide and silicon oxide as its main component, namely, the compound generally indicated as $ZnS$—$SiO_2$. The material of the second dielectric layer 32 is also not limited, and may be selected from such materials as oxides such as silicon oxide, tantalum oxide, and chromium oxide; nitrides such as germanium nitride and silicon nitride; carbide such as silicon carbide; sulfide such as ZnS; and mixtures thereof such as $Zns$—$SiO_2$.

The recording layer 4 comprises a phase change material. In the present invention, the composition of the recording layer is not particularly limited. The present invention, however, is particularly effective when the recording layer comprises a Ge—Sb—Te-based system as described below.

When the atomic ratio of Ge, Sb and Te in the Ge—Sb—Te-based system of the recording layer is represented by the formula (I):

$$Ge_aSb_bTe_{1-a-b} \qquad (I)$$

a and b are preferably in the range of:

$$0.08 \leq a \leq 0.35,$$

and $$0.12 \leq b \leq 0.40.$$

If the value of a is too small in the formula (I), record marks are less likely to crystallize and erasability will be reduced. If the value of a is too large, a large amount of tellurium will bond to germanium to invite separation of antimony and formation of the record marks will be limited.

If the value of b is too small, content of tellurium will be too much and the record marks are likely to crystallize during storage at elevated temperature to detract from reliability. If the value of b is too large, antimony will separate to limit formation of the record marks.

To realize the crystallization temperature of at least 160° C., the composition of the recording layer is preferably adjusted within the range as described above for the formula (I) such that the composition of the recording layer is on the GeTe—$Sb_2Te_3$ eutectic line and between $Ge_2Sb_2Te_5$ and GeTe or such that the composition is deviated to Sb rich side or Te rich side from the eutectic line. However, when the composition is on the eutectic line and too close to GeTe, or when the composition is greatly deviated to Sb rich side or Te rich side from the eutectic line, crystallization rate will be excessively retarded to render erasure difficult. In view of such situation, in order to increase the crystallization temperature while avoiding excessive slowing of the erase speed, atomic ratio of Ge, Sb and Te as represented by the formula (II):

$$Ge_aSb_bTe_c \qquad (II)$$

is preferably controlled such that:

$$0.23 \leq a \leq 0.32,$$

$$0.12 \leq b \leq 0.27,$$

$$0.50 \leq c \leq 0.58,$$

$$a+b+c=1$$

For the purpose of increasing the crystallization temperature of the recording layer of Ge—Sb—Te-based system irrespective of its elemental ratio, addition of nitrogen is effective. Amount of the nitrogen added may be determined depending on the crystallization temperature required. It is, however, desirable to add the nitrogen such that nitrogen content in the recording layer is in the range of 2 to 15 at %. Excessively high nitrogen content will result in excessively reduced reflectance in its crystalline phase.

Figure 3:
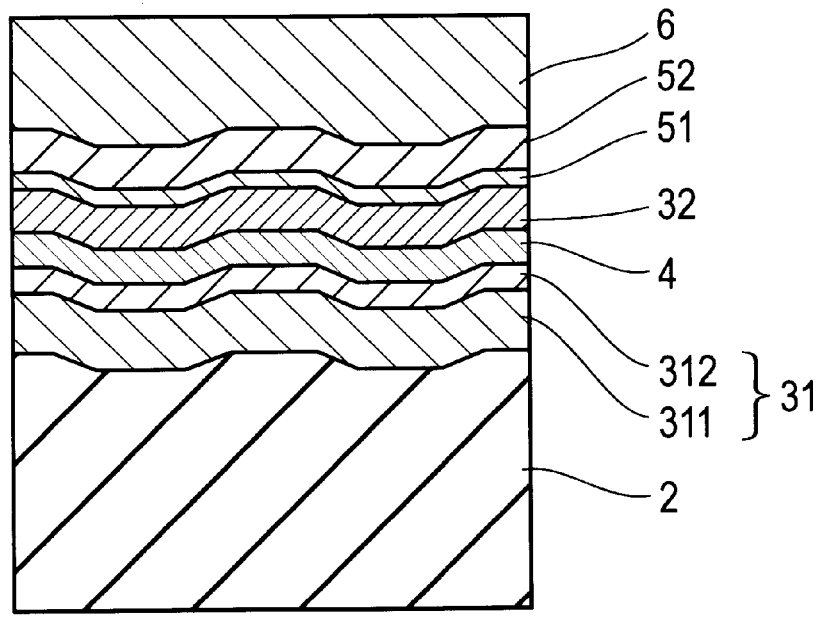
FIG. 3 is a cross sectional view of the optical recording medium according to a further embodiment of the present invention.

The reflective layer 5 may comprise a metal of high thermal conductivity, for example, a metal containing at least one of aluminum, silver, copper and gold to facilitate heat dissipation from the recording layer 4. The reflective layer 5 is preferably formed to a thickness of about 10 to about 500 nm. It should be noted that the reflective layer may comprise either a single-layer structure or a multi-layer structure comprising two or more layers of different compositions. For example, the reflective layer may comprise a laminate structure of a first reflective layer 51 on the side of the second dielectric layer 32 and a second reflective layer 52 on the side of the protective layer 6 as shown in FIG. 3. A reflective layer containing gold, silver or copper as its main component is desirable in view of high heat dissipation properties. Optical designing of high reflectance for the reflective layer of such composition, however, is difficult. However, high heat dissipation and high reflectance can be easily realized at once when the reflective layer comprises a first reflective layer 51 containing aluminum as its main component and a second reflective layer 52 containing gold, silver or copper as its main component. In such case, the first reflective layer 51 is preferably formed to a thickness of at least 10 nm. It should be noted that the constitution shown in FIG. 3 is the same as that of FIG. 2 except for the reflective layer.

EXAMPLES

Examples of the present invention are given below by way of illustration and not by way of limitation.

Example 1

A substrate 2 in the form of a land/groove double spiral disc having a diameter of 120 mm and a thickness of 0.6 mm was prepared by injection molding polycarbonate. Grooves were simultaneously formed in the injection molding of the substrate 2. On the grooved surface of the substrate 2, there were formed a unit dielectric layer 311, a unit dielectric layer 312, a recording layer 4, a second dielectric layer 32, a reflective layer 5, and a protective layer 6 by the procedure as described below to produce the optical recording disc samples having the structure as shown in FIG. 2.

In the substrate 2, grooves were formed to a width of 0.6 $\mu$m and a depth of 65 nm and at a pitch of 1.2 $\mu$m.

The unit dielectric layer 311 was formed by sputtering in argon atmosphere using ZnS (80 mol %)—$SiO_2$ (20 mol %) for the target. The unit dielectric layer 311 was formed to a thickness of 160 nm. The unit dielectric layer 312 in contact with the recording layer 4 was formed by sputtering in argon atmosphere using $Cr_2O_3$ for the target. The unit dielectric layer 312 was formed to a thickness of 2 nm.

The recording layer 4 was formed by sputtering in argon and nitrogen ($Ar+N_2$) atmosphere using $Ge_2Sb_2Te_5$ for the target. The recording layer 4 was formed to a thickness of 18 nm. The recording layer had a nitrogen content of 6 at % as measured by fluorescent X-ray analysis for a film of 200 nm thick formed under the same conditions as the recording layer.

The second dielectric layer 32 was formed by sputtering in argon atmosphere using ZnS (50 mol %)—$SiO_2$ (50 mol %) for the target. The second dielectric layer 32 was formed to a thickness of 30 nm.

The reflective layer 5 was formed by sputtering in argon atmosphere using Al—1.7 at % Cr for the target. The reflective layer 5 was formed to a thickness of 200 nm.

The protective layer 6 was formed by applying a UV curable resin by spin coating and exposing it to UV for curing. The protective layer as cured had a thickness of 5 $\mu$m.

In this sample, the recording layer 4 had a crystallization temperature of 180° C. The crystallization temperature was determined by detecting the temperature of maximum reflectance alteration when a film formed on a slide glass under the same conditions as the recording layer was heated at a temperature elevation rate of 10° C./min.

The thermal conductivity was 0.6 W/m·K at the unit dielectric layer 311, 3.0 W/m·K at the unit dielectric layer 312, and 0.63 W/m·K as the entire first dielectric layer. The second dielectric layer 32 had a thermal conductivity of 1.0 W/m·K. These thermal conductivity values were measured by using a quick thermal conductivity detector (Kemtherm QTM-500) for a dielectric film of 1 $\mu$m thick formed on the substrate under the same conditions as the corresponding dielectric layer. This method of thermal conductivity measurement using a quick thermal conductivity detector is generally referred to as QTM method. In the QTM method, a probe comprising a matrix of known thermal conductivity having a heating wire and a thermocouple arranged on its surface is employed, and such probe is brought in close contact with the item to be measured to thereby measure the thermal conductivity. More illustratively, a substrate having a dielectric film of 1 $\mu$m thick on its surface and a substrate free from such dielectric film were measured for their thermal conductivity, and the thermal conductivity of the dielectric film was calculated from the measurements.

The thus produced samples were initialized by a bulk eraser, and the initialized samples were evaluated for their properties on an optical recording medium evaluator under the conditions as described below.

Laser beam wavelength: 634 nm

NA: 0.6

Relative linear velocity: 8.2 m/s

Modulation system: 8–16 modulation

Figure 4A:
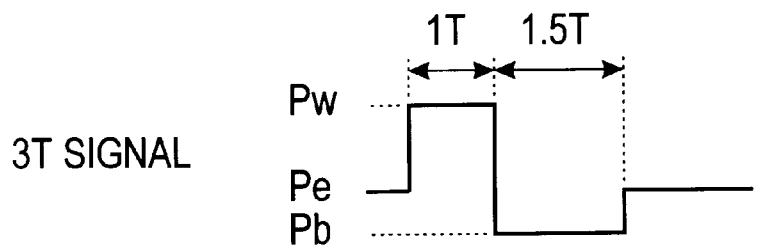
FIGS. 4A and 4B are schematic views showing the recording waveform used in the present invention.
Figure 4B:
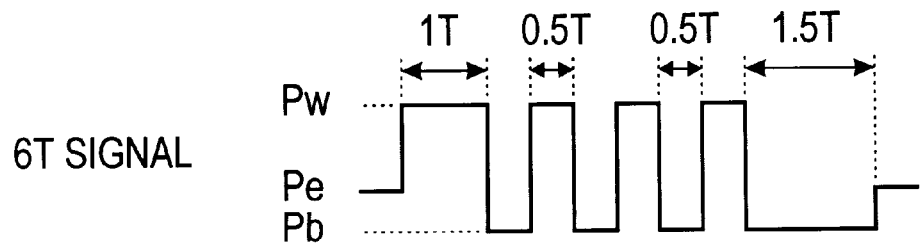

Recording waveform: the pulse pattern shown in FIGS. 4A and 4B

Recording power Pw: optimal value in the sample

Erasing power Pe: optimal value in the sample

Bottom power Pb: optimal value in the sample

The properties were evaluated by recording random signals on the track to be evaluated for 10 times; recording random signals on the adjacent track for 0, 1, 10 or 100 times; erasing the signals recorded on the adjacent track; measuring the signals reproduced from the evaluation track with a time interval analyzer; and calculating the jitter (clock jitter) by $\sigma/T$ (%)

wherein T stands for the window width. It should be noted that such evaluation was conducted for the land/groove recording (at a recording track pitch of 0.6 $\mu$m) and for both cases wherein the groove was used for the evaluation track and wherein the land was used for the evaluation track. In the occurrence of the cross erase of substantial level, the record marks of the evaluated track are affected to invite increase in the jitter. The results are shown in Table 3.

TABLE 3

| Number of recording operations | Jitter (%) | |
|---|---|---|
| on the adjacent track | Groove | Land |
| 0 | 10.5 | 9.5 |
| 1 | 12.2 | 9.8 |
| 10 | 12.1 | 9.9 |
| 100 | 11.2 | 9.6 |

As shown in Table 3, recording on the adjacent track in this sample resulted in little increase in the jitter, and cross erase was sufficiently suppressed.

Example 2

A sample optical recording disc was produced by repeating the procedure of Example 1 except that the reflective layer had a double-layer structure as shown in FIG. 3. The first reflective layer 51 was formed as in the case of Example 1 except for the thickness of 50 nm. The second reflective layer 52 was formed by sputtering in argon atmosphere using gold for the target. The second reflective layer 52 was formed to a thickness of 200 nm.

The sample was evaluated for its properties by repeating the procedure of Example 1. The results are shown in Table 4.

TABLE 4

| Number of recording operation | Jitter (%) | |
|---|---|---|
| on the adjacent track | Groove | Land |
| 0 | 10.3 | 9.3 |
| 1 | 11.7 | 9.7 |
| 10 | 11.6 | 9.9 |
| 100 | 10.9 | 9.5 |

As shown in Table 4, increase in the jitter was suppressed to an extent further than Table 3, and cross erase was even more sufficiently suppressed.

Comparative Example 1

A sample optical recording disc was produced by repeating the procedure of Example 1 except that the recording layer was formed by sputtering in argon atmosphere instead of argon and nitrogen (Ar+N$_2$) atmosphere. In this sample, the recording layer 4 had a crystallization temperature of 150° C.

The sample was evaluated for its properties by repeating the procedure of Example 1. The results are shown in Table 5.

TABLE 5

| Number of recording operation | Jitter (%) | |
|---|---|---|
| on the adjacent track | Groove | Land |
| 0 | 10.6 | 9.5 |
| 1 | 12.5 | 10.0 |
| 10 | 15.6 | 11.3 |
| 100 | 18.9 | 12.4 |

As shown in Table 5, the jitter in this sample increased with the increase in the number of recording operations on the adjacent track. Cross erase was insufficiently suppressed.

Comparative Example 2

A sample optical recording disc was produced by repeating the procedure of Example 1 except that the composition of the second dielectric layer 32 was changed to the one of the unit dielectric layer 311 remote from the recording layer 4. As a consequence, the thermal conductivity was 0.63 W/m·K in the first dielectric layer and 0.6 W/m·K in the second dielectric layer, and the thermal conductivity of the first dielectric layer was higher than that of the second dielectric layer.

The sample was evaluated for its properties by repeating the procedure of Example 1. The results are shown in Table 6.

TABLE 6

| Number of recording operation | Jitter (%) | |
|---|---|---|
| on the adjacent track | Groove | Land |
| 0 | 10.4 | 9.3 |
| 1 | 11.7 | 10.3 |
| 10 | 12.6 | 11.5 |
| 100 | 14.3 | 12.6 |

As shown in Table 6, the jitter in this sample increased with the increase in the number of recording operations on the adjacent track. Cross erase was insufficiently suppressed.

Examples 3, 4 and 5 and Comparative Examples 3 and 4

Sample optical recording discs having the structure as shown in FIG. 2 were produced by the procedure as described below.

The substrate 2 was the same as the one employed in Example 1. The unit dielectric layer 311 was formed as in the case of Example 1 to the same thickness. The unit dielectric layer 312 was formed to a thickness of 10 nm by sputtering in argon and nitrogen (Ar+N$_2$) atmosphere using germanium for the target. The unit dielectric layer 312 had a thermal conductivity of 1.5 W/m·K, and therefore, the thermal conductivity of the first dielectric layer is 0.65 W/m·K.

The recording layer 4 was formed by multi-target sputtering in argon atmosphere using Ge$_2$Sb$_2$Te$_5$ target and GeTe target except for Example 5 wherein the sputtering was conducted in argon and nitrogen (Ar+N$_2$) atmosphere. The composition of the recording layer was adjusted by regulating the discharge period of each target. The recording layer was formed to a thickness of 14 nm.

The second dielectric layer 32 was formed as in the case of the unit dielectric layer 312 except for Comparative Example 4 wherein the second dielectric layer 32 was formed as in the case of the unit dielectric layer 311. The second dielectric layer 32 was formed to a thickness of 30 nm.

Composition of the recording layer (proportion of each of Ge, Sb and Te in relation to (Ge+Sb+Te) and N content in the recording layer) as measured by fluorescent X-ray analysis, crystallization temperature (Tx) of the recording layer, thermal conductivity of the first dielectric layer, and thermal conductivity of the second dielectric layer are shown in Table 7. Difference in jitter between the initial jitter (the jitter measured after recording the signals on the evaluation track) and the jitter after recording the signals on the evaluation track, recording random signals on the adjacent track for 10 times, and erasing the signals recorded on the adjacent track is also shown in Table 7. It should be noted that the jitter evaluation was conducted as in the case of Example 1 by using the groove for the evaluation track.

TABLE 7

| | Recording layer | | | | | Thermal conductivity (W/mK) | | |
| --- | --- | --- | --- | --- | --- | --- | --- | --- |
| | Ge/ (Ge + Sb + Te) | Sb/ (Ge + Sb + Te) | Te/ (Ge + Sb + Te) | N content (at %) | Tx (° C.) | First dielectric layer | Second dielectric layer | Difference in jitter (%) |
| Example 3 | 0.25 | 0.20 | 0.55 | 0 | 160 | 0.65 | 1.5 | 0.7 |
| Example 4 | 0.28 | 0.18 | 0.54 | 0 | 170 | 0.65 | 1.5 | 0.5 |
| Example 5 | 0.25 | 0.20 | 0.55 | 3 | 180 | 0.65 | 1.5 | 0.4 |
| Comparative Example 3 | 0.22 | 0.22 | 0.56 | 0 | 150 | 0.65 | 1.5 | 2.1 |
| Comparative Example 4 | 0.25 | 0.20 | 0.55 | 0 | 160 | 0.65 | 0.6 | 3.2 |

As shown in Table 7, jitter difference was reduced, and hence, cross erase upon recording of the adjacent track was reduced in the samples of Examples 3 to 5 wherein the crystallization temperature of the recording layer as well as the relation between the thermal conductivity values of the dielectric layers were within the scope of the present invention. In contrast, jitter difference was markedly increased in Comparative Examples 3 and 5 wherein either the crystallization temperature of the recording layer or the relation between the thermal conductivity values of the dielectric layers was outside the scope of the present invention.

The results of the Examples and the Comparative Examples demonstrate benefits of adjusting the crystallization temperature of the recording layer to a value higher than the predetermined value simultaneously with the adjustment of the thermal conductivity of the second dielectric layer to a value higher than that of the first dielectric layer.

Benifits of the Invention

In the present invention, cross erase is sufficiently suppressed and favorable recording/reproducing properties are realized in high density recording, and in particular, when the track pitch is less than 0.7 µm.

Japanese Patent Application No. 330149/1998 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium comprising a substrate, and a first dielectric layer, a recording layer of phase change type, a second dielectric layer, and a reflective layer disposed on the substrate in this order, wherein the recording layer has a crystallization temperature of at least 160° C., and the second dielectric layer has a thermal conductivity higher than that of the first dielectric layer.

2. An optical recording medium according to claim 1 wherein the medium has a recording track pitch of less than 0.7 µm.

3. An optical recording medium according to claim 1 wherein the recording layer contains Ge, Sb and Te as its main components.

4. An optical recording medium according to claim 3 wherein the recording layer contains nitrogen.

5. An optical recording medium according to claim 1 wherein the first dielectric layer comprises two or more unit dielectric layers, and the unit dielectric layer of the first dielectric layer in contact with the recording layer has a thermal conductivity higher than that of the adjacent unit dielectric layer in contact with the unit dielectric layer in contact with the recording layer.

6. An optical recording medium according to claim 1 wherein the first dielectric layer comprises two or more unit dielectric layers, and the unit dielectric layer of the first dielectric layer in contact with the recording layer contains at least one of germanium nitride, silicon nitride, silicon oxide, and chromium oxide as its main component, and the adjacent unit dielectric layer in contact with the unit dielectric layer in contact with the recording layer contains a mixture of zinc sulfide and silicon oxide as its main component.

7. An optical recording medium according to claim 1 wherein the reflective layer contains at least one of aluminum, silver, copper, and gold.

8. An optical recording medium according to claim 1 wherein the reflective layer comprises two or more layers, and the layer in contact with the second dielectric layer contains aluminum as its main component.

9. An optical recording medium according to claim 1 wherein the recording layer has a thickness in the range of 10 to 18 nm.

* * * * *